United States Patent [19]
Jermyn, Jr.

[11] Patent Number: 5,634,246
[45] Date of Patent: Jun. 3, 1997

[54] SNAP SWIVEL HOOK ASSEMBLY INCORPORATING BALL SWIVEL AND RECESSED HOOK LATCH RELEASE MECHANISM

[75] Inventor: Richard A. Jermyn, Jr., Panama City, Fla.

[73] Assignee: The United States of America as represented by the Secretary of the Navy, Washington, D.C.

[21] Appl. No.: 559,876

[22] Filed: Nov. 20, 1995

[51] Int. Cl.⁶ .............................. A44B 13/02; F16B 45/02
[52] U.S. Cl. .................. 24/601.5; 24/599.5; 24/600.2; 24/265 H; 294/82.21; 294/82.34
[58] Field of Search ..................... 24/601.5, 599.5, 24/600.2, 265 H, 265 CD, 265 EC, 905; 59/95; 403/131; 294/82.21, 82.34

[56] References Cited

U.S. PATENT DOCUMENTS

| | | | |
|---|---|---|---|
| 967,141 | 8/1910 | Merriman | 24/601.5 |
| 1,507,840 | 9/1924 | Landgraf | 403/131 X |
| 1,508,705 | 9/1924 | Mahan | 294/82.21 |
| 3,911,671 | 10/1975 | Guillen | 294/82.34 X |
| 4,174,132 | 11/1979 | Crook, Jr. | 294/82.34 X |
| 4,309,052 | 1/1982 | Drayton | 24/599.5 X |
| 4,617,704 | 10/1986 | Kasai | 24/905 X |
| 5,381,650 | 1/1995 | Garrett | 59/95 |

FOREIGN PATENT DOCUMENTS

| | | | |
|---|---|---|---|
| 184001 | 12/1955 | Germany | 403/131 |
| 1553080 | 9/1979 | United Kingdom | 59/95 |

OTHER PUBLICATIONS

Catalog p. 251 entitled "Snapshackles".

Primary Examiner—Peter M. Cuomo
Assistant Examiner—Hanh V. Tran
Attorney, Agent, or Firm—Harvey A. Gilbert

[57] ABSTRACT

A snap swivel hook assembly includes a hook subassembly having a hook body and an elongated stem portion extending therefrom, and a swivel subassembly having a swivel collar and swivel ball seated thereon and being coupled with the elongated connector stem of the hook subassembly such that swivel subassembly can undergo concurrently rotational movement about and a limited degree of pivotal movement relative to hook subassembly. The hook subassembly also includes a hook latch release mechanism adapted to secure a latch member of the hook subassembly at a closed position relative to a cavity defined in the hook body so as to prevent pivotal movement of the latch member from the closed position to an opened position. The hook latch release mechanism also is actuatable to release the latch member from the closed position so as to permit pivotal movement thereof to the opened position. A release tab of the hook latch release mechanism is positioned within a recessed notch in the hook body to prevent it from snagging or catching on an external object while, at the same time, making it accessible for manual gripping between fingers of a user to actuate the hook latch release mechanism.

20 Claims, 3 Drawing Sheets

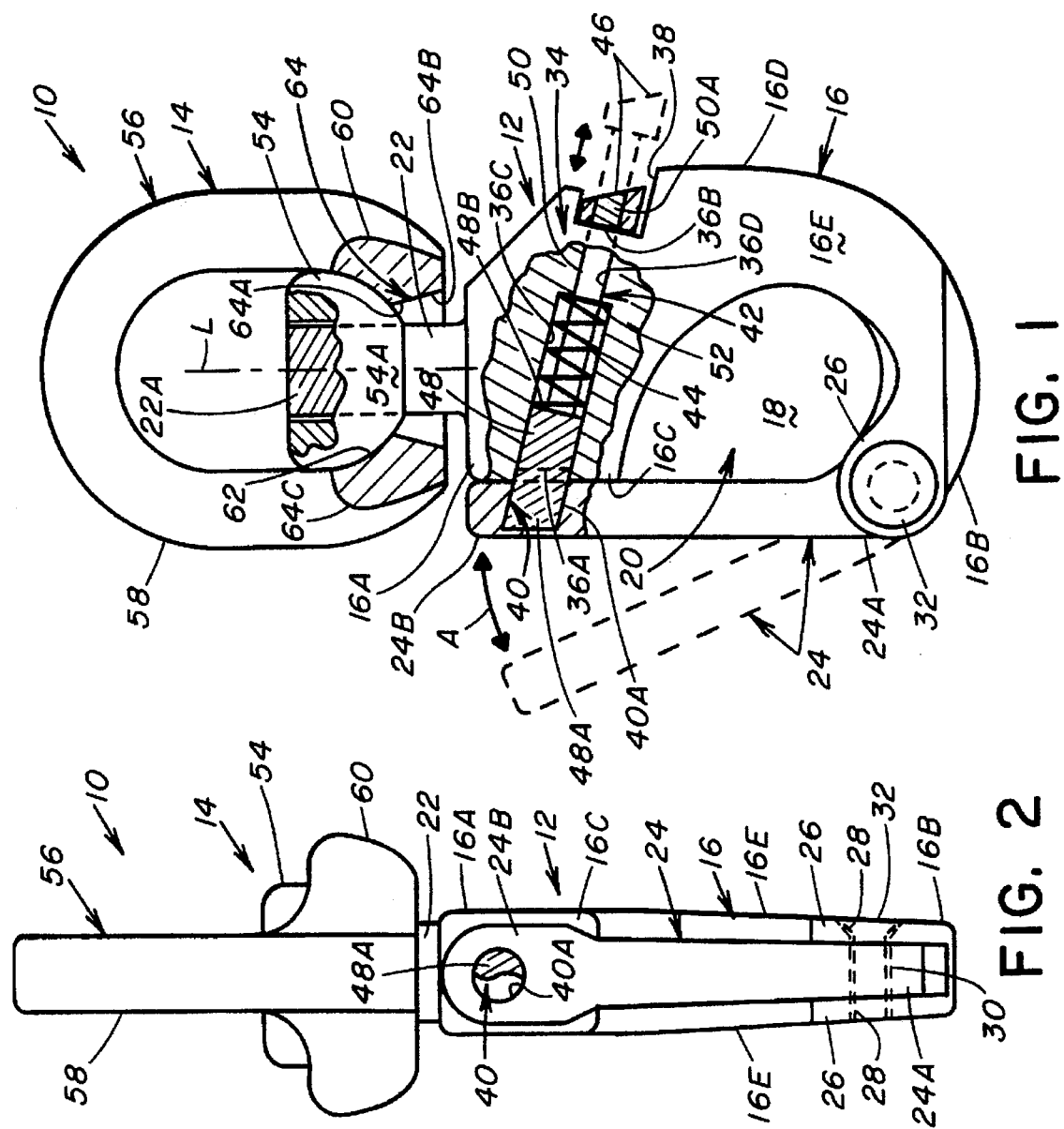

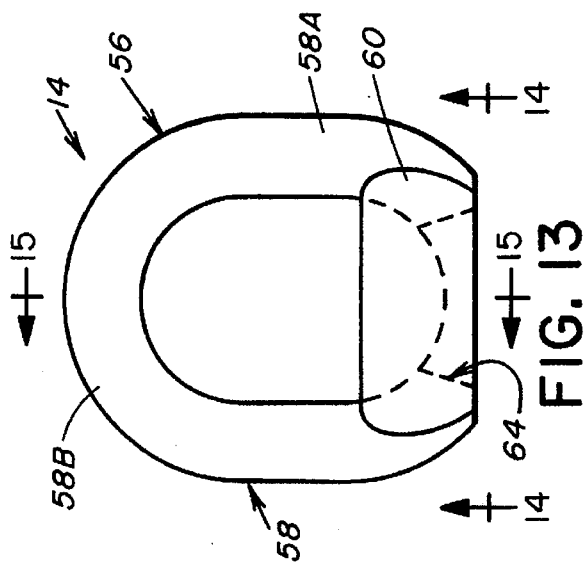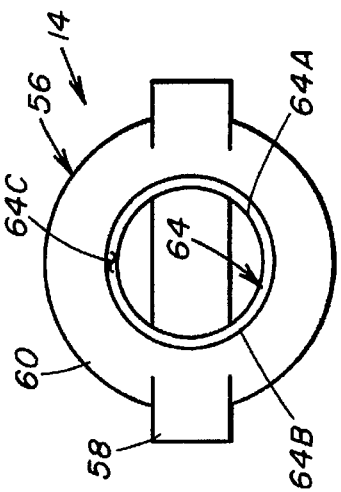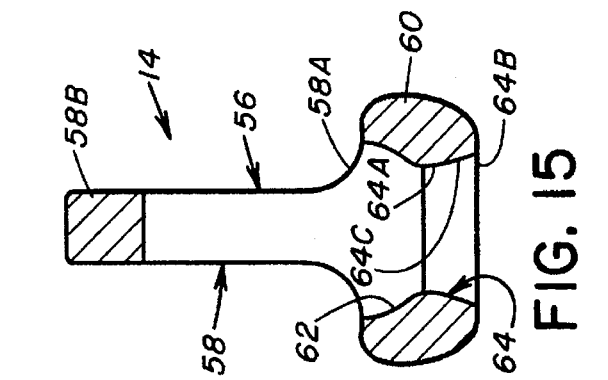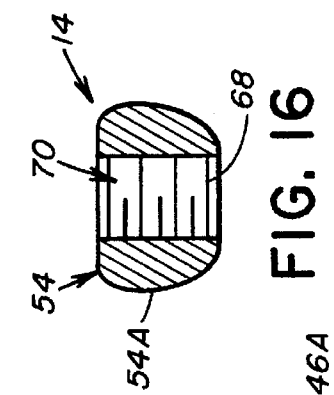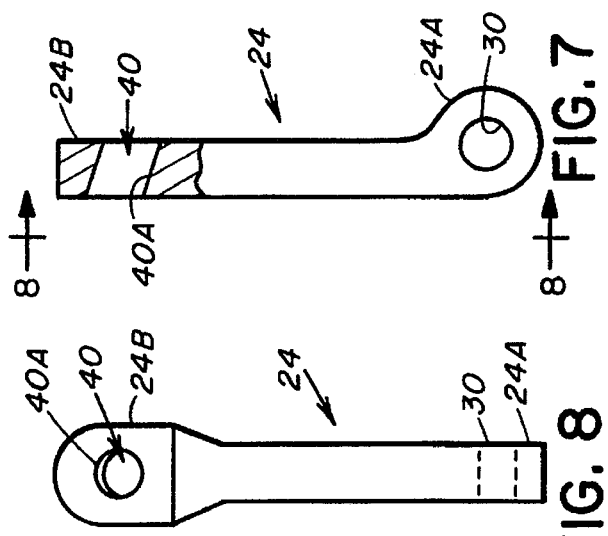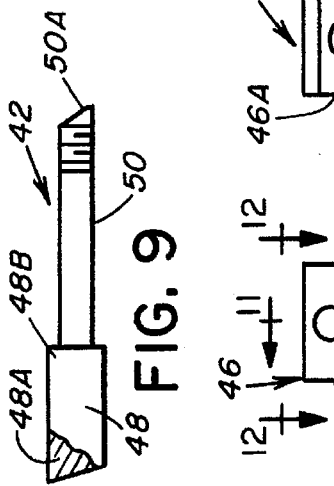

SNAP SWIVEL HOOK ASSEMBLY INCORPORATING BALL SWIVEL AND RECESSED HOOK LATCH RELEASE MECHANISM

BACKGROUND OF THE INVENTION

1. Field of the Invention

The present invention generally relates to snap-type swivel hooks for securement to cables and the like for passing over rollers, drums and the like and, more particularly, is concerned with a snap swivel hook assembly incorporating a ball swivel and recessed hook release mechanism.

2. Description of the Prior Art

Heretofore, swivel hooks attached to cables used in certain military applications, such as onboard U.S. Navy mine sweeping helicopters, have simply been commerically available types commonly used on modern pleasure sailing vessels. Such military applications contemplate that the cables and the swivel hooks attached thereto will be passed over and wound about rollers, drums, spools, sheaves and the like. These swivel hooks typically are attached to the cables by forming an eye in the cable, inserting it through the eye of the swivel part of the swivel hook and then passing the cable through the cable eye.

These swivel hooks as used heretofore in military applications have several drawbacks. First, they often break at the point where the swivel part of the swivel hook rotatably connects to the hook part of the swivel hook because the swivel and hook parts cannot withstand the cyclical bending which occurs when the swivel hook is forced over the rollers, drums, spools, sheaves and the like. Second, they typically have pins, rings or loops used to open and/or secure a latch part of the hook that will bend and thus become non-operational when high loads are imposed on the swivel hooks as they pass over rollers, drums, sheaves, spools and the like, or when high tension cables are wound over the swivel hooks as they are wound on a drum or spool.

Consequently, a need still exists for an improved design for a swivel hook which will overcome the drawbacks of the prior art without introducing new ones in their place.

SUMMARY OF THE INVENTION

The present invention provides a snap swivel hook assembly designed to satisfy the aforementioned need. The snap swivel hook assembly of the present invention incorporates a ball swivel and recessed hook release mechanism which are particularly designed to be able to pass over rollers, drums, sheaves, spools and the like without damaging the snap swivel hook assembly, catching or snagging on other equipment, or sacrificing the capability of the snap swivel hook assembly to maintain a load safely secured to the cable.

Accordingly, the present invention is directed to a snap swivel hook assembly which comprises: (a) a hook subassembly including (i) an arcuate-shaped hook body defining a cavity and having a pair of inner and outer end portions spaced apart from one another and defining an opening through the hook body to the cavity, (ii) an elongated connector stem attached to and extending from the inner end portion of the hook body, and (iii) an elongated latch member having a pair of first and second opposite end portions and being mounted at the first end portion to the outer end portion of the hook body so as to undergo pivotal movement between a closed position in which the latch member blocks the opening to the cavity in the hook body and the second end of the latch member is disposed adjacent to the inner end portion of the hook body and an opened position in which the latch member unblocks the opening to the cavity in the hook body and the second end portion of the latch member is spaced from the inner end portion of the hook body; and (b) a hook latch release mechanism adapted to secure the latch member at the second end portion thereof to the hook body at the closed position so as to prevent pivotal movement thereof to the opened position and for releasing the latch member at the second end portion thereof from the hook body so as to permit pivotal movement thereof to the opened position. The hook latch release mechanism is contained within an exterior profile of the hook subassembly defined by respective exteriors of the latch member and hook body thereof with the latch member at the closed position such that no portion of the hook latch release mechanism protrudes beyond such exterior profile of the hook subassembly to where the hook latch release mechanism can be snagged by an external device passing closely adjacent to the snap hook swivel assembly.

Additionally, the present invention is directed to a snap swivel hook assembly which comprises: (a) a hook subassembly including (i) an arcuate-shaped hook body defining a cavity and having a pair of opposite end portions spaced apart from one another and defining an opening through the hook body to the cavity, (ii) an elongated connector stem attached to and extending from one of the end portions of the hook body, and (iii) latch means mounted to the hook body to undergo pivotal movement between a closed position in which the opening to the cavity in the hook body is blocked and an opened position in which the opening to the cavity in the hook body is unblocked; and (b) a swivel subassembly coupled with the elongated connector stem of the hook body for concurrently undergoing rotational movement about and pivotal movement relative to the connector stem and thereby relative to the hook subassembly.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view, with portions broken away and sectioned, of a snap swivel hook assembly of the present invention.

FIG. 2 is a front elevational view of the assembly as seen along line 2—2 of FIG. 1.

FIG. 3 is a rear elevational view of the assembly as seen along line 3—3 of FIG. 1.

FIG. 7 is a side elevational view, with portions broken away and sectioned, of a latch member of the assembly of FIG. 1 being shown by itself.

FIG. 8 is a rear elevational view of the latch member as seen along line 8—8 of FIG. 7.

FIG. 9 is a side elevational view of a release pin of the assembly of FIG. 1 being shown by itself.

FIG. 10 is a front elevational view of a release tab of the assembly of FIG. 1 being shown by itself.

FIG. 11 is a cross-sectional view of the release tab taken along line 11—11 of FIG. 10.

FIG. 12 is a top plan view of the release tab as seen along line 12—12 of FIG. 10.

FIG. 13 is a side elevational view of a swivel connector of the assembly of FIG. 1 being shown by itself.

FIG. 14 is a bottom plan view of the swivel connector as seen along line 14—14 of FIG. 13.

FIG. 15 is a longitudinal sectional view of the swivel connector taken along line 15—15 of FIG. 14.

FIG. 16 is a longitudinal sectional view of a swivel ball of the assembly of FIG. 1 being shown by itself.

DETAILED DESCRIPTION OF THE INVENTION

Figure 6:
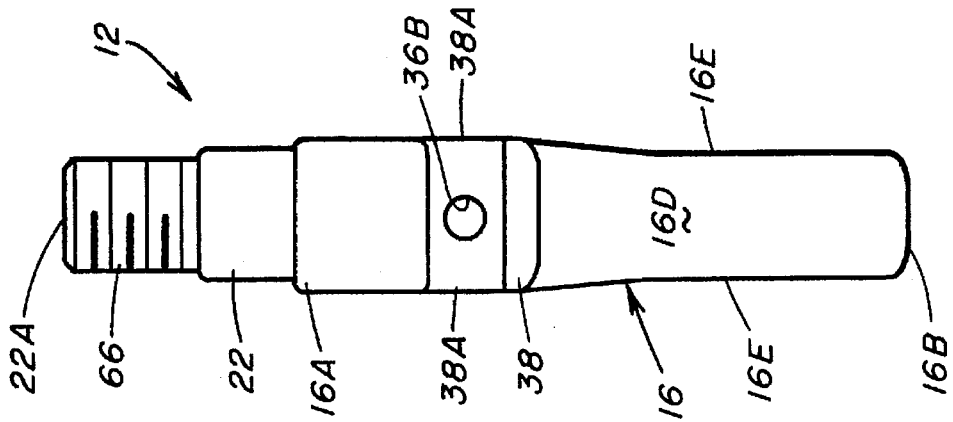
FIG. 6 is a rear elevational view of the hook body as seen along line 6—6 of FIG. 4.

Referring to the drawings and particularly to FIGS. 1 to 3, there is illustrated a snap swivel hook assembly, generally designated 10, of the present invention. Basically, the snap swivel hook assembly 10 includes a hook subassembly 12 and a swivel subassembly 14 coupled thereto to undergo concurrently both 360°. rotational movement relative to the hook subassembly 12 and a limited amount, such as 15°. in opposite directions from a longitudinal axis L through the hook subassembly 12, of side-to-side rocking or pivotal movement relative to the hook subassembly 12.

Figure 4:
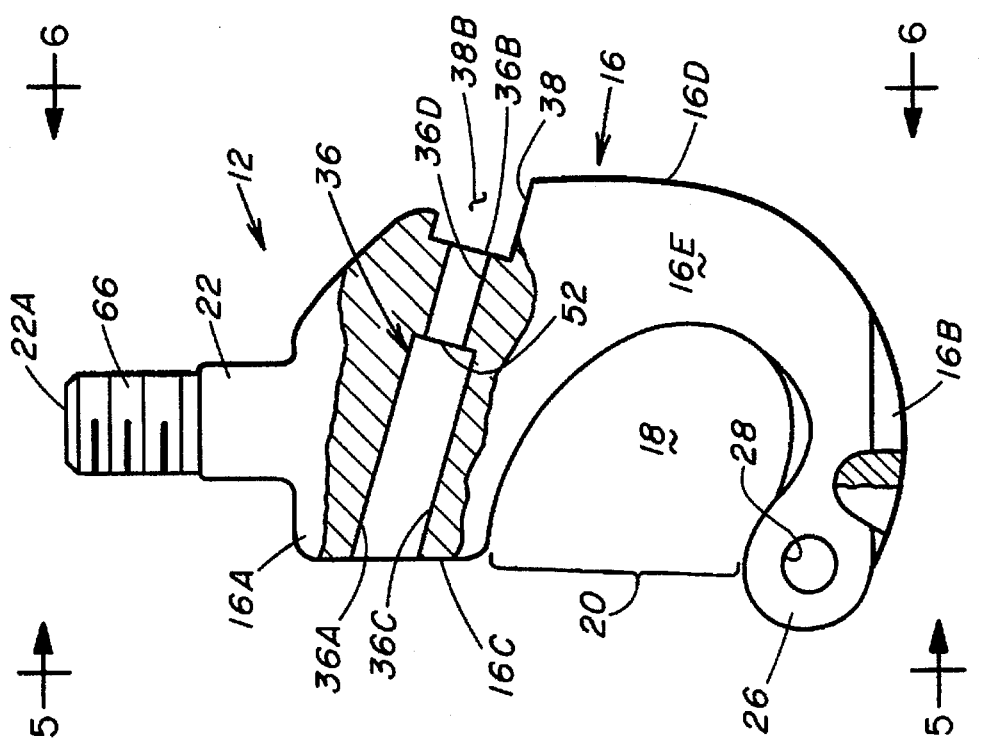
FIG. 4 is a side elevational view, with portions broken away and sectioned, of an arcuate-shaped hook body of the assembly of FIG. 1 being shown by itself.
Figure 5:
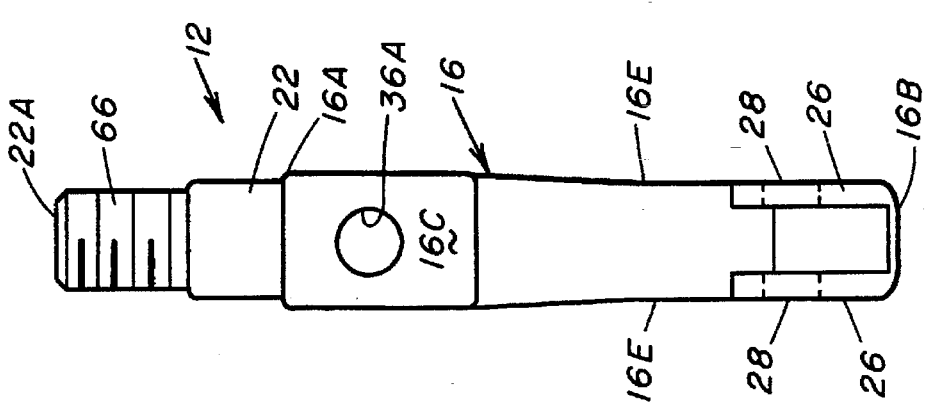
FIG. 5 is front elevational view of the hook body as seen along line 5—5 of FIG. 4.

Referring to FIGS. 1–12, the hook subassembly 12 of the snap swivel hook assembly 10 includes a hook body 16 having an arcuate shape defining a cavity 18 of fixed size for receiving components, such as a portion of a cable and the like, to secure the cable to the hook body 16. The hook body 16 has a pair of inner and outer end portions 16A, 16B spaced apart from one another and defining an opening 20 through the hook body 16 to the cavity 18. The hook subassembly 12 also includes an elongated connector stem 22 fixedly attached to and extending outwardly from the inner end portion 16A of the hook body 16 along the longitudinal axis L of the hook subassembly 12.

The hook subassembly 12 of the snap swivel hook assembly 10 further includes an elongated latch member 24 mounted to the hook body 16 to undergo pivotal movement between a closed position, as shown in solid line form in FIG. 1, in which the opening 20 to the cavity 18 in the hook body 16 is blocked and an opened position, as shown in dashed line form in FIG. 1, in which the opening 20 to the cavity 18 in the hook body 16 is unblocked. The latch member 24 has a generally straight shape and a pair of first and second opposite end portions 24A, 24B. The outer end portion 16B of the hook body 16 is bifurcated so as to define a pair of ears 26 each with a central aperture 28. The latch member 24 which has an aperture 30 through its first end portion 24A is disposed at its first end portion 24A between the pair of ears 26 on the outer end portion 16B of the hook body 16 with the aperture 30 of the latch member 24 aligned with the central apertures 28 in the hook body 16. A suitable fastener 32, such as a rivet, is installed through the aligned apertures 28, 30 so as to pivotally mount the latch member 24 to the hook body 16.

The latch member 24, being so mounted, is thereby adapted to undergo pivotal movement between the closed position in which the latch member 24 blocks the opening 20 to the cavity 18 and the opened position in which the latch member 24 unblocks the opening 20 to the cavity 18. In the closed position, the latch member 24 is disposed along a generally linear path across the opening 20 between the inner and outer end portions 16A, 16B of the hook body 16 with the second end portion 24B disposed adjacent to and preferably in contact with the inner end portion 16A of the hook body 16. On the other hand, in the opened position, the latch member 24 is pivoted along an arcuate path of movement, as represented by arrow A, away from the opening 20 between the inner and outer end portions 16A, 16B of the hook body 16 with the second end portion 24B disposed away and spaced from the one side of the inner end portion 16A of the hook body 16. As is clearly shown in FIG. 1, the cavity 18 is defined solely within the hook body 16 and remains fixed in size regardless of whether the latch member 24 is disposed in the opened or closed position relative to the hook body 16.

The hook subassembly 12 of the snap swivel hook assembly 10 further includes a hook latch release mechanism 34 for securing the latch member 24 to the hook body 16 at the closed position so as to prevent pivotal movement thereof to the opened position and for releasing the latch member 24 from the closed position so as to permit pivotal movement thereof to the opened position. More particularly, the hook latch release mechanism 34 includes a passageway 36 formed in and extending through the inner end portion 16A of the hook body 16. The passageway 36 extends between first and second ends 36A, 36B thereof. The first end 36A of the passageway 36 opens at a first side 16C of the hook body 16 adjacent to the latch member 24, whereas the second end 36B of the passageway 36 opens at a second side 16D of the hook body 16 remote from the latch member 24.

The hook latch release mechanism 34 also includes a recessed notch 38 formed in the inner end portion 16A of the hook body 16 adjacent to the second side 16D thereof and extending transversely to and intersecting with the second end 36B of the passageway 36 through the hook body 16. The recessed notch 38 has a pair of opposite open sides 38A opening at respective opposite lateral sides 16E of the hook body 16 adjacent to the second side 16D thereof and an open end 38B opening at the second side 16D of the hook body 16 and extending between the lateral sides 16E of the hook body 16 and merging into the pair of opposite open sides 38A of the recessed notch 38.

The hook latch release mechanism 34 also includes a hole 40 defined in the second end portion 24B of the latch member 24. The hole 40 is aligned with the first open end 36A of the passageway 36 through the inner end portion 16A of the hook body 16 when the latch member 24 is at the closed position relative to the hook body 16.

Additionally, the hook latch release mechanism 34 includes a release pin 42, a coiled spring 44, and a release tab 46. The release pin 42 has a forward plunger 48 and a rearward shaft 50 axially aligned with and rigidly connected to the forward plunger 48. The forward plunger 48 has a latching end 48A and the rearward shaft 50 has an opposite actuating end 50A. The forward plunger 48 is larger in diameter than the rearward shaft 50 and, correspondingly, the hole 40 of the latch member 24 and a forward portion 36C of the passageway 36 which receive the forward plunger 48 of the release pin 42 are larger in diameter than a rearward portion 36D of the passageway 36 which receives the rearward shaft 50 of the release pin 42. The release pin 42 so sized thus is slidably mounted in the passageway 36 for undergoing reciprocal movement through and relative to the hook body 16 between an extended position, as seen in solid line form in FIG. 1, and a retracted position, as seen in dashed line form in FIG. 1. The passageway 36 and hole 40 also are oriented relative to the arcuate path of movement of the latch member 24, as represented by arrow A, such that the latching end 48A of the forward plunger 48 of the release pin 42 when extended into the hole 40 in the latch member 24 engages a continuous interior sidewall 40 therein forming the hole 40 so as to obstruct and prevent movement of the latch member 24 away from the latching end 48A of the release pin 42 when in the extended position.

The coil spring 44 of the mechanism 34 is disposed in the larger diameter forward portion 36C of the passageway 36 and positioned over the rearward shaft 50 of the release pin 42 and thus captured between a rear end 48B of the forward plunger 48 of the release pin 42 and a forwardly facing annular interior shoulder 52 in the hook body 16 which provides a transitional step between the larger diameter forward portion 36C and smaller diameter rearward portion 36D of the passageway 36. The coil spring 44 is under sufficient compression to bias the release pin 42 to move from right to left in FIG. 1 and thus move and maintain the latching end 48A of the plunger 48 to and at the extended position shown in solid line form in FIG. 1.

The release tab 46 of the mechanism 34 is disposed substantially within the recessed notch 38 of the hook body 16 and attached to the opposite actuating end 50A of the rearward shaft 50 of the release pin 42. The release tab 46 has opposite ends 46A disposed adjacent to and exposed at the pair of opposite open sides 38A of the recessed notch 38. Although the release tab 46 is substantially received and thus "hidden" within the recessed notch 38 of the hook body 16, the opposite open sides 38A of the recessed notch 38 provides access to the opposite ends 46A of the release tab 46 by a user for gripping the release tab 46 between two fingers of the user in order to pull on and slidably move the release pin 42, against the biasing force of the coiled spring 44, from the extended position, as shown in solid line form in FIG. 1, to the retracted position, as shown in dashed line form in FIG. 1.

To recapitulate, in the extended position of the release pin 42, the latching end 48A of its forward plunger 48 projects from the first end 36A of the passageway 36 of the hook body 16 into the hole 40 of the latch member 24 so as to prevent pivotal movement of the latch member 24 away from the closed position to the opened position. On the other hand, in the retracted position of the release pin 42, the latching end 48A of its forward plunger 48 is withdrawn from the hole 40 through the second end portion 24B of the latch member 24 to within the first open end 36A of the forward portion 36C of the passageway 36 in the hook body 16 so as to be clear of engagement with the interior sidewall 40A in the latch member 24 and thereby permit pivotal movement of the latch member 24 away from the closed position to the opened position.

From the foregoing description of the hook latch release mechanism 34, it can be readily observed and understood that the mechanism 34 is contained and "hidden" within an exterior profile of, or an envelope occupied by, the hook subassembly 12 being defined by the respective exteriors of its latch member 24 and hook body 16 when the latch member 24 is at the closed position. No portions of the hook latch release mechanism 34 protrude beyond such exterior profile or envelope of the hook subassembly 12 to where portions of the mechanism 34 can be snagged and thus actuated or damaged by foreign equipment located or passing closely adjacent to the snap hook swivel assembly 10.

Referring to FIGS. 1–3 and 13–16, the swivel subassembly 14 of the snap swivel hook assembly 10 is coupled with the elongated connector stem 22 extending from the hook body 16 of the hook subassembly 12 of the assembly 10 for undergoing concurrently rotational movement about and pivotal movement relative to the central longitudinal axis L of the connector stem 22 and thereby relative to the hook subassembly 12. More particularly, the swivel subassembly 14 includes a swivel ball 54 and a swivel connector 56. The swivel ball 54 has an exterior annular surface 54A of a convex shape and, more specifically, of a substantially semispherical shape. The swivel connector 56 has a connector body 58 in the shape of an annular ring with inner and outer opposite end portions 58A, 58B, and a swivel collar 60 fixedly attached on and extending laterally outwardly from the inner end portion 58A of the connector body 58.

More particularly, the swivel collar 60 of the swivel connector 56 defines an outer annular seat 62 in the form of an interior annular surface of a concave shape conforming to the convex shape of the exterior annular surface 54A of the swivel ball 54 so as to mount the swivel ball 54 on the outer annular seat 62 of the swivel collar 60 to undergo swiveling movement relative thereto. The swivel collar 60 also defines an inner central bore 64 through the connector body 58 having an outer open end 64A surrounded by the outer annular seat 62, an inner open end 64B spaced from the outer open end 64A, and a continuous annular sidewall 64C extending between the outer and inner open ends 64A, 64B. The outer and inner open ends 64A, 64B are both larger in diameter than the elongated connector stem 22 of the hook subassembly 12 so as to adapt the swivel collar 60 to receive the connector stem 22 through the inner central bore 64 and permit the rotational movement of the swivel subassembly 14 about the longitudinal axis L of the hook subassembly 12 defined by the connector stem 22. Furthermore, the inner open end 64B of the inner central bore 64 of the swivel collar 60 is larger in diameter than the outer open end 64A thereof so as to provide the continuous annular sidewall 64C of the inner central bore 64 with a conical shape and thereby permit the pivotal movement of the swivel subassembly 14 relative to the hook subassembly 12. In one example, the conical or flared configuration of the sidewall 64C is selected to permit about 15°. of side-to-side arcuate pivotal movement of the swivel subassembly 14 in opposite directions away from the longitudinal axis L of the hook subassembly 12.

The swivel subassembly 14 further includes suitable means for detachably attaching the outer end 22A of the elongated connector stem 22 of the hook subassembly 12 to the swivel ball 54 of the swivel subassembly 14. One suitable form of such detachable attaching means is complementary external and internal sets of threads 66, 68 defined respectively on the outer end 22A of the connector stem 22 and within a central opening 70 defined through the swivel ball 54. This form of the attaching means provides for a convenient and easy manner by which the hook subassembly 12 and swivel subassembly 14 are assembled to and disassembled from one another.

From the foregoing description of the swivel subassembly 14, it can be readily understood that the hook and swivel subassemblies 12, 14 no longer provide the snap swivel hook assembly 10 as a longitudinally rigid device. Instead, the snap swivel hook assembly 10 is articulated longitudinally so as to permit pivoting of the swivel subassembly 14 relative to the hook subassembly 12 through a limited amount, such as 15°, to either side of the longitudinal axis L thereof which thereby reduces vulnerability of the assembly 10 to bending stresses and ultimately fracture at the swivel point of the assembly 10 as it passes over and about the curved surfaces of rollers, drums, spools, sheaves and the like.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A snap swivel hook assembly, comprising:
   (a) a hook subassembly including
     (i) an arcuate-shaped hook body defining a cavity of fixed size for receiving a component to secure the component to said hook body and having a pair of inner and outer end portions spaced apart from one another and defining an opening through said hook body to said cavity,
     (ii) an elongated connector stem attached to and extending from said inner end portion of said hook body of said hook subassembly, and
     (iii) a generally straight elongated latch member having a pair of first and second opposite end portions and being mounted at said first end portion to said outer end portion of said hook body of said hook subassembly so as to undergo pivotal movement relative to said hook body between a closed position in which said opening to said cavity in said hook body is blocked by said latch member disposed along a generally linear path across said opening between said inner and outer end portions of said hook body with said second end of said latch member being disposed adjacent to said inner end portion of said hook body and an opened position in which said opening to said cavity in said hook body is unblocked by said latch member pivoted along an arcuate path of movement away from said opening between said inner and outer end portions of said hook body with said second end portion of said latch member being spaced from said inner end portion of said hook body, said cavity being defined solely within said hook body and remaining fixed in size regardless of whether said generally straight latch member is disposed in said opened or closed position relative to said hook body; and
   (b) a hook latch release mechanism mounted to said hook body and being operable to secure said second end portion of said generally straight latch member adjacent to said inner end portion of said arcuate-shaped hook body at said closed position so as to prevent pivotal movement of said latch member to said opened position, said hook latch release mechanism also being operable to release said second end portion of said latch member from adjacent to said inner end portion of said hook body so as to permit pivotal movement of said latch member to said opened position, said hook latch release mechanism being contained within an exterior profile of said hook subassembly defined by respective exteriors of said latch member and hook body thereof with said latch member at said closed position such that no portion of said hook latch release mechanism protrudes beyond said exterior profile of said hook subassembly to where said hook latch release mechanism can be snagged by an external device passing closely adjacent to said snap hook swivel assembly.

2. The assembly of claim 1 wherein said hook latch release mechanism includes means defining a passageway extending through said inner end portion of said hook body, said passageway having a first end open at a first side of said hook body adjacent to said latch member and a second end open at a second side of said hook body remote from said latch member.

3. The assembly of claim 2 wherein said hook latch release mechanism further includes means defining a hole in said second end portion of said latch member being aligned with said passageway through said inner end portion of said hook body when said latch member is at said closed position.

4. The assembly of claim 3 wherein said hook latch release mechanism further includes a release pin having a latching end and an opposite actuating end and being slidably mounted in said passageway for reciprocal movement relative to said hook body between a retracted position in which said latching end of said release pin is withdrawn from said hole of said latch member to within said first end of said passageway of said hook body so as to permit pivotal movement of said latch member away from said closed position to said opened position and an extended position in which said latching end of said release pin is projected from said first end of said passageway of said hook body into said hole of said latch member so as to prevent pivotal movement of said latch member away from said closed position to said opened position.

5. The assembly of claim 4 wherein said hook latch release mechanism further includes means defining a recessed notch in said inner end portion of said hook body extending transversely to and intersecting with said second end of said passageway through said hook body, said recessed notch having a pair of opposite open sides being opened at opposite lateral sides of said hook body adjacent to said second side thereof and an open end being opened at said second side of said hook body and extending between opposite said lateral sides of said hook body and merging into said pair of opposite open sides of said recessed notch.

6. The assembly of claim 5 wherein said hook latch release mechanism further includes a release tab disposed substantially within said recessed notch of said hook body and attached to said opposite actuating end of said release pin, said release tab having opposite ends disposed adjacent to and exposed at said pair of opposite open sides of said recessed notch for gripping said release tab between fingers of a user in order to slidably move said release pin from said extended position to said retracted position.

7. The assembly of claim 1 further comprising:
   (c) a swivel subassembly coupled with said elongated connector stem of said hook body of said hook subassembly for concurrent rotational movement about and pivotal movement relative to said connector stem and thereby relative to said hook subassembly.

8. The assembly of claim 7 wherein said swivel subassembly includes a swivel ball having an exterior annular surface of a convex shape.

9. The assembly of claim 8 wherein said swivel subassembly further includes a connector body having inner and outer opposite end portions.

10. The assembly of claim 9 wherein said swivel subassembly further includes a swivel collar attached on and extending laterally outwardly from said inner end portion of said connector body, said swivel collar defining an outer annular seat having an interior annular surface of a concave shape conforming to said convex shape of said exterior annular surface of said swivel ball so as to mount said swivel ball on said outer annular seat of said swivel collar to undergo swiveling movement relative thereto, said swivel collar also defining an inner central bore through said connector body having an outer open end surrounded by said outer annular seat, an inner open end spaced from said outer open end and a continuous annular sidewall extending between said outer and inner open ends, said outer and inner open ends being larger in diameter than said connector stem of said hook assembly so as to adapt said swivel collar to receive said connector stem through said inner central bore and permit said rotational movement of said swivel subassembly about said connector stem of said hook subassembly, said inner open end of said central bore of said swivel collar being larger in diameter than said outer open end thereof so as to provide said continuous annular sidewall of said central bore with a conical shape and thereby permit said pivotal movement of said swivel subassembly relative to said hook subassembly.

11. The assembly of claim 10 wherein said swivel subassembly further includes means for detachably attaching an end of said elongated connector stem of said hook subassembly to said swivel ball of said swivel subassembly.

12. The assembly of claim 11 wherein said means for detachably attaching said end of said elongated connector stem of said hook subassembly to said swivel ball of said swivel subassembly includes complementary external and internal sets of threads defined on said end of said connector stem and in a central opening defined through said swivel ball.

13. A snap swivel hook assembly, comprising:
(a) a hook subassembly including
  (i) an arcuate-shaped hook body defining a cavity of fixed size for receiving a component to secure the component to said hook body and having a pair of inner and outer end portions spaced apart from one another and defining an opening through said hook body to said cavity,
  (ii) an elongated connector stem attached to and extending from said inner end portion of said hook body of said hook subassembly, and
  (iii) a generally straight elongated latch member having a pair of first and second opposite end portions and being mounted at said first end portion to said outer end portion of said hook body of said hook subassembly so as to undergo pivotal movement between a closed position in which said opening to said cavity in said hook body is blocked by said latch member disposed along a generally linear path across said opening between said inner and outer end portions of said hook body with said second end of said latch member being disposed adjacent to said inner end portion of said hook body and an opened position in which said opening to said cavity in said hook body is unblocked by said latch member pivoted along an arcuate path of movement away from said opening between said inner and outer end portions of said hook body with said second end portion of said latch member being spaced from said inner end portion of said hook body, said cavity being defined solely within said hook body and remaining fixed in size regardless of whether said generally straight latch member is disposed in said opened or closed position relative to said hook body;
(b) a hook latch release means mounted to said inner end portion of said hook body for securing said second end portion of said generally straight latch member at said closed position adjacent to said arcuate-shaped hook body so as to prevent pivotal movement of said latch member to said opened position and for releasing said second end portion of said latch member from said closed position adjacent to said hook body so as to permit pivotal movement of said latch member to said opened position; and
(c) a swivel subassembly coupled with said elongated connector stem of said hook body of said hook subassembly for concurrent rotational movement about and pivotal movement relative to said connector stem and thereby relative to said hook subassembly.

14. The assembly of claim 13 wherein said swivel subassembly includes a swivel ball having an exterior annular surface of a convex shape.

15. The assembly of claim 14 wherein said swivel subassembly further includes a connector body having inner and outer opposite end portions.

16. The assembly of claim 15 wherein said swivel subassembly further includes a swivel collar attached on and extending laterally outwardly from said inner end portion of said connector body, said swivel collar defining an outer annular seat having an interior annular surface of a concave shape conforming to said convex shape of said exterior annular surface of said swivel ball so as to mount said swivel ball on said outer annular seat of said swivel collar to undergo swiveling movement relative thereto, said swivel collar also defining an inner central bore through said connector body having an outer open end surrounded by said outer annular seat, an inner open end spaced from said outer open end and a continuous annular sidewall extending between said outer and inner open ends, said outer and inner open ends being larger in diameter than said elongated connector stem of said hook assembly so as to adapt said swivel collar to receive said connector stem through said inner central bore and permit said rotational movement of said swivel subassembly about said connector stem of said hook subassembly, said inner open end of said central bore of said swivel collar being larger in diameter than said outer open end thereof so as to provide said continuous annular sidewall of said central bore with a conical shape and thereby permit said pivotal movement of said swivel subassembly relative to said hook subassembly.

17. The assembly of claim 16 wherein said swivel subassembly further includes means for detachably attaching an end of said elongated connector stem of said hook subassembly to said swivel ball of said swivel subassembly.

18. The assembly of claim 17 wherein said means for detachably attaching said end of said elongated connector stem of said hook subassembly to said swivel ball of said swivel subassembly includes complementary external and internal sets of threads defined on said end of said connector stem and in a central opening defined through said swivel ball.

19. A snap swivel hook assembly, comprising:
(a) a hook subassembly including
  (i) an arcuate-shaped hook body defining a cavity of fixed size for receiving a component to secure the component to said hook body and having a pair of inner and outer end portions spaced apart from one another and defining an opening through said hook body to said cavity,
  (ii) an elongated connector stem attached to and extending from said inner end portion of said hook body of said hook subassembly, said connector stem defining a central axis of said hook subassembly, and
  (iii) a generally straight elongated latch member having a pair of first and second opposite end portions and being mounted at said first end portion to said outer end portion of said hook body so as to undergo pivotal movement relative to said hook body between a closed position in which said opening to said cavity in said hook body is blocked by said latch member disposed along a generally linear path across said opening between said inner and outer end portions of said hook body with said second end of said latch member disposed adjacent to said inner end portion of said hook body and an opened position in which said opening to said cavity in said hook body is unblocked by said latch member pivoted along an arcuate path of movement away from said opening between said inner and outer end portions of said hook body with said second end portion of said latch member being spaced from said inner end portion of said hook body, said cavity being defined solely within said hook body and remaining fixed in size regardless of whether said generally straight latch member is disposed in said opened or closed position relative to said hook body;

(b) means for securing said generally straight latch member at said closed position adjacent to said arcuate-shaped hook body so as to prevent pivotal movement of said latch member to said opened position and for releasing said latch member from said closed position adjacent to said hook body so as to permit pivotal movement of said latch member to said opened position, said securing and releasing means including (i) means defining a passageway extending through said inner end portion of said hook body, said passageway having a first end open at a first side of said hook body adjacent to said latch member and a second end open at a second side of said hook body remote from said latch member;

(ii) means defining a recessed notch in said inner end portion of said hook body extending transversely to and intersecting with said second end of said passageway through said hook body, said recessed notch having a pair of opposite open sides being opened at opposite lateral sides of said hook body adjacent to said second side thereof and an open end being opened at said second side of said hook body and extending between opposite said lateral sides of said hook body and merging into said pair of opposite open sides of said recessed notch, (iii) means defining a hole in said second end portion of said latch member being aligned with said passageway through said inner end portion of said hook body when said latch member is disposed at said closed position adjacent to said inner end portion of said hook body, (iv) a release pin having a latching end and an opposite actuating end and being slidably mounted in said passageway for reciprocal movement relative to said hook body between a retracted position in which said latching end of said release pin is withdrawn from said hole of said latch member to within said first end of said passageway of said hook body so as to permit pivotal movement of said latch member away from said closed position to said opened position and an extended position in which said latching end of said release pin is projected from said first end of said passageway of said hook body into said hole of said latch member so as to prevent pivotal movement of said latch member away from said closed position to said opened position, and (v) a release tab disposed substantially within said recessed notch of said hook body and attached to said second end of said release pin, said release tab having opposite ends disposed adjacent to and exposed at said pair of opposite open sides of said recessed notch for gripping said release tab between fingers of a user in order to slidably move said release pin from said extended position to said retracted position; and (c) a swivel subassembly coupled with said elongated connector stem portion of said hook body of said hook subassembly for concurrent rotational movement about and pivotal movement relative to said central axis of said connector stem portion and thereby relative to said hook subassembly, said swivel subassembly including (i) a swivel ball having an exterior annular surface of a convex shape, (ii) a connector body having inner and outer opposite end portions, (iii) a swivel collar attached on and extending laterally outwardly from said inner end portion of said connector body, said swivel collar defining an outer annular seat having an interior annular surface of a concave shape conforming to said convex shape of said exterior annular surface of said swivel ball so as to mount said swivel ball on said outer annular seat of said swivel collar to undergo swiveling movement relative thereto, said swivel collar also defining an inner central bore through said connector body having an outer open end surrounded by said outer annular seat, an inner open end spaced from said outer open end and a continuous annular sidewall extending between said outer and inner open ends, said outer and inner open ends being larger in diameter than said connector stem of said hook assembly so as to adapt said swivel collar to receive said connector stem through said inner central bore and permit rotational movement of said swivel subassembly about said connector stem of said hook subassembly, said inner open end of said central bore of said swivel collar being larger in diameter than said outer open end thereof so as to provide said continuous annular sidewall of said central bore with a conical shape and thereby permit said pivotal movement of said swivel subassembly relative to said central axis of said hook subassembly, and (iv) means for detachably attaching an end of said elongated connector stem of said hook subassembly to said swivel ball of said swivel subassembly.

20. The assembly of claim 19 wherein said means for detachably attaching said end of said elongated connector stem of said hook subassembly to said swivel ball of said swivel subassembly includes complementary external and internal sets of threads defined on said end of said connector stem and in a central opening defined through said swivel ball.

* * * * *